United States Patent [19]
Karpen

[11] Patent Number: 5,359,498
[45] Date of Patent: Oct. 25, 1994

[54] ULTRAVIOLET TRANSMITTING MULTI-LAYER POLARIZER

[76] Inventor: Daniel N. Karpen, 3 Harbor Hill Dr., Huntington, N.Y. 11743

[21] Appl. No.: 964,656

[22] Filed: Oct. 21, 1992

[51] Int. Cl.$^5$ .............................................. F21V 9/14
[52] U.S. Cl. ........................................ 362/19; 362/1; 362/2
[58] Field of Search ................................ 362/1, 2, 19

[56] References Cited

U.S. PATENT DOCUMENTS

| | | | |
|---|---|---|---|
| 1,918,848 | 7/1933 | Land et al. | 359/492 |
| 2,104,949 | 1/1938 | Marks | 359/485 |
| 3,069,974 | 12/1962 | Marks et al. | 359/488 |
| 3,124,639 | 3/1964 | Kahn | 359/488 |
| 3,772,128 | 11/1973 | Kahn et al. | 156/555 |
| 3,829,680 | 8/1974 | Jones | 362/330 |
| 3,912,921 | 10/1975 | Howe et al. | 362/19 |
| 4,071,748 | 1/1978 | Dey | 362/19 |
| 4,796,160 | 1/1989 | Kahn | 362/19 |
| 5,149,184 | 9/1992 | Hughes et al. | 362/1 |
| 5,184,881 | 2/1993 | Karpen | 362/1 |

OTHER PUBLICATIONS

Disclosure Document 315,781. Filed on Aug. 21, 1992.
Lovins, Amory, et al. State of the Art: Lighting. Rocky Mountain Institute Snowmass, Colo. 81654 (1988) p. 157.
Rohm and Haas Technical Bulletin PL-612, 1988.
Barrows, William E. Light Photometry and Illuminating Engineering McGraw Hill Book Company 1938 p. 26.
Rohm and Hass Technical Bulletin PL-612e, p. 5, 1985.
The Science of Color, Optical Society of America Washington D.C. 1953, p. 76.
Halliday, David and Resnick, Robert, Physics John Wiley & Sons, 1966 p. 1014–1015.
Feynman, Richard et al. The Feynman Lectures on Physics vol. 1, Addison Wesley Publishing, Company Reading, Mass. 1963 pp. 32–38.
Duffie, John, A., Solar Energy Thermal Processes, John Wiley & Sons, New York 1974, p. 14.
Cayless, M. A. and Marsden, A. M. Lamps and Lighting Edward Arnold; London, 1983 p. 4.
Jerome, Charles W. "Effect of Bulb Wall Temperatures on Fluorscent Lamp Parameters", Illuminating Engineering, Feb. 1956 pp. 205–213.
Cobby Percy W, and Moss, Frank B. Lighting and Contrast Transactions of the Illuminating Engineering Society Feb. 1927 pp. 195–204
Marks, Alvin, "Multilayer Polarizers and Their Application to General Polarized Lighting" Illuminating Engineering Feb 1959 p. 127.

*Primary Examiner*—Stephen F. Husar
*Attorney, Agent, or Firm*—Alfred M. Walker

[57] ABSTRACT

An improvement in a multi-layer polarized light control panel comprising an ultraviolet transmitting acrylic supporting structure. Prior art multi-layer polarized light control panels are made with an ultraviolet absorbing acrylic supporting sheet, which blocks most ultraviolet light below 380 nanometers. Thus, the ultraviolet light which is emitted by fluorescent lamps, and in particular by specially formulated fluorescent lamps to provide so called "full-spectrum" light, is blocked by the prior art polarized light control panels. Use of an ultraviolet transmitting acrylic supporting sheet would permit the transmission of the ultraviolet light emitted from the lamp through the acrylic supporting sheet, which would then be polarized by the multi-layer polarized light control panel. The light diffusing polarized control panel can also be manufactured with an ultraviolet transmitting acrylic, providing a multi-layer polarizer of unsurpassed visual comfort probability. Transmission of ultraviolet light through the multi-layer polarized control panel would eliminate the glare from the ultraviolet light, as well as the visible light. There is a significant improvement of the apparent brightness of paper and textile products when viewed under light sources equipped with full-spectrum, as well as standard fluorescent lamps, as virtually all paper materials and textiles have chemical substances which fluoresce under ultraviolet light.

3 Claims, 2 Drawing Sheets

ULTRAVIOLET TRANSMITTING MULTI-LAYER POLARIZER

BACKGROUND OF THE INVENTION

1. Field of the Invention

The invention relates to the field of diffusers for commercial lighting fixtures and in particular for diffusers capable of providing vertically polarized light, both in the visible and ultraviolet portions of the electromagnetic spectrum.

2. Document Disclosure Program

The application for patent is based on a disclosure filed on Aug. 21, 1992, as Disclosure Document No. 315,781, under the Document Disclosure Program.

3. Description of Prior Art

It has long been recognized that in order to provide glare free illumination, light polarization is essential. By the use of polarized lighting, glare is minimized and contrast is increased. Lighting in most non-residential buildings is largely fluorescent.

Materials that can provide polarized light were a laboratory curiosity until the development of dichroic linear polarizers in sheet form by Land (see for example, LAND, "Polarizers Containing Aligned Crystals of Herapathite", U.S. Pat. No. 1,918,848 (1933)), and by Marks (see for example, MARKS, "Crystalline Formation", U.S. Pat. No. 2,104,949 (1938)).

The linear dichroic polarizers, while useful in many applications, were not suitable for use in commercial lighting fixtures for general illumination purposes. First of all, the polarization was only in one direction. A second major problem was the increase in electrical power needed for lighting as the linear dichroic polarizers absorbed between 60 and 72 percent of the incident light energy being transmitted through them. In particular, the linear dichroic polarizers absorbed most of the ultraviolet light, and much of the purple and blue light in the visible spectrum.

It took the invention of the so called "radial polarizer" by Marks and Kahn in the years after World War II to solve both of these problems (see for example, MARKS, "Multi-layered Light Polarizers", U.S. Pat. No. 3,069,974 (1962) and KAHN "Light Polarizing Structures", U.S. Pat. No. 3,124,639 (1964)).

The invention of the radialens style lighting panel by Jones (see JONES, "Lighting Panel", U.S. Pat. No. 3,829,680 (1974)), provided a diffuser for use in a lighting fixture that could minimize glare from veiling-reflections. This panel contained a continuous pattern of triangular projections, each having three mutually substantially perpendicular surfaces projecting upward towards the light source. The base lines of the mutually perpendicular surfaces are co-planar and the pattern of projections is such that the base lines of all projections on the panel form continuous straight lines directed in specific directions. This results in a light panel which minimizes veiling reflections from the illuminated matter. The panel provides a radial distribution of light with a high lighting efficiency and with a maximum of light in the area which is 30° to 60° from vertical.

Kahn combined the prismatic structure of the JONES Radialens manufactured according to the methodologies and structure of KAHN's polarizing panel (see KAHN, "Light Polarizing Structures", U.S. Pat. No. 3,124,639, (1964), cited above) to obtain the higher visual acuity realized with polarized light with the wider angular distribution of the Radialens panel and the desirable Visual Comfort Probability of 70 or more into an integral structure. What was achieved is not merely the expected advantages of polarized and Radialens light distribution, but also a marked improvement in Visual Comfort Probability and also a reduction in glare at wide angles as disclosed in U.S. Pat. No. 4,796,160 (1989) to KAHN, which is hereby incorporated by reference.

A major problem with the Polarized Radialens and all of the radial multi-layer polarizers manufactured for commercial lighting fixtures is the apparent reduction in brightness. This reduction in brightness is so severe as to be noted by a number of lighting practioners (see, Lovins, Amory, et. al. *STATE OF THE ART: LIGHTING*, Rocky Mountain Institute, Snowmass, Colo. 81654, (1988), page 157). The objection sometimes encountered with the multi-layer polarized diffusers is that they are so effective that they can give room lighting a "dull" subtly flat quality by suppressing the specular highlights which harsh lighting has led us to expect as visual cues.

Part of this difficulty has been remedied by the inventor's use of full-spectrum fluorescent lamps with multi-layer polarizers (see KARPEN, "Device for Full-Spectrum Polarized Lighting System", U.S. Pat. No. 5,184,881, (1992), (Ser. No. 07/781,844), filed Oct. 24, 1991, allowed Jul. 13, 1992).

An unrecognized problem with all multi-layer polarized diffusers used for commercial lighting fixtures is the type of acrylic plastic used as the supporting material for the polarizer which is adhered to the bottom side of the acrylic sheet. Typically, these multi-layer polarized diffusers are manufactured by extrusion using Type V Series acrylic molding powders as manufactured by Rohm and Haas (Philadelphia, Pa.) or a similar product. The polarizing material is adhered by heat to the bottom of the sheet (see KAHN, "Machine for Continuously Producing Large Area Light Polarizing Panels", U.S. Pat. No. 3,772,128 (1973)). FIG. 1 shows the transmission properties of the Type V Series acrylic molding powder when used to produce an acrylic sheet 0.125 inches thick (taken from Rohm and Haas Technical Bulletin PL-612, (1988)). The light transmission properties of the Type V Series acrylic molding powders is shown for wavelengths between 250 and 450 nanometers. This 0.125 inch thickness is the thickness of the commercially available multi-layer polarized diffusers. The major problem is that the acrylic manufactured from the Type V Series acrylic molding powder transmits less than 50 percent of the ultraviolet light with a wavelength of less than 380 nanometers.

The present invention solves this problem by providing a Type UVT acrylic molding powder or a similar material. The multi-layer polarized diffuser which results from the use of the Type UVT acrylic molding powder is capable of transmitting ultraviolet light with wavelengths as low as 290 nanometers. The resulting transmission of ultraviolet wavelengths all the way down to 290 nanometers provides a substantial improvement in the quality of the illumination.

In addition to solving the problem of absorption of ultraviolet in the 290 to 380 nanometer range, it is noteworthy that none of the patents by Marks or Kahn cited above make any mention of the unrecognized need to polarize the ultraviolet light given off by fluorescent, metal halide, or a number of other light sources as a way of improving the contrast and apparent brightness of objects viewed under a combination of visible and ultraviolet light. The present invention not only transmits the ultraviolet in the 290 to 380 nanometer range, but also polarizes it as well.

4. Theory of the Invention

The key to the present invention is that virtually all paper and textile materials, and many paints and pigments have substances such as optical brighteners that fluoresce under ultraviolet light between 290 and 420 nanometers. The fluorescent effects add to brightness by transforming the ultraviolet radiation between 290 and 420 nanometers into longer wavelength radiation in the visible spectrum (see Barrows, William E., *Light, Photometry, and Illuminating Engineering*, McGraw-Hill Book Company, New York, (1938), p. 26).

Thus, if the multi-layer polarizers were so modified to be manufactured with an acrylic supporting material that could transmit ultraviolet light so it could be polarized by the multi-layer polarizing material on the bottom of the light polarizing structure, the advantage of the invention is that it would be possible to increase the apparent brightness of paper and textile materials being illuminated by a light source giving off ultraviolet as well as visible light. It should be noted that when compared to an unpolarized light source, the ultraviolet light will be vertically polarized as well, so it will be glare free, as it is well known that glare from unpolarized radiation is detrimental to one's eyes and the ability to see.

FIG. 1 also shows the transmission properties of an ultraviolet transmitting acrylic made from an acrylic molding powder such as the UVT type acrylic molding powder as manufactured by Rohm and Haas (taken from Rohm and Haas Technical Bulletin PL-612e, (1985), p. 5) from 250 to 450 nanometers. It should be noted that acrylic sheets manufactured from this acrylic molding powder will transmit 85 percent of the ultraviolet light with a wavelength greater than 315 nanometers.

Thus, the application of an ultraviolet transmitting acrylic would permit the transmission of the ultraviolet light emitted from a light source through the supporting acrylic so the ultraviolet light would then be polarized by the multi-layer polarizing materials which are adhered to the bottom of the acrylic sheet, which is the side of the sheet facing towards the objects being illuminated.

It should be noted that ultraviolet light is not detectable by a standard photopic light meter which measures visible light according to the Standard Observer Curve ($\lambda$) as established by the International Commission on Illumination. Thus, using the present invention, objects will appear brighter, even though the measured footcandles will be virtually the same for a light source in the visible as compared with a light source which emits the same visible light plus some ultraviolet light. It will then be necessary to develop new photometric instruments that will integrate the fluorescent effects of ultraviolet light into the Standard Observer Curve $V(\lambda)$ for the photopic region.

It is also not generally known that the eye responds to ultraviolet light. In the young healthy eye the ocular media are sufficiently transparent to allow a substantial amount of ultraviolet energy (so-called "invisible") of wavelength as short as 350 nanometers to reach the retina and evoke a visual sensation. Smaller amounts of wavelengths as short as 300 nanometers may be transmitted, but this effect is not important in ordinary vision at high levels of luminance (see *The Science of Color*, Optical Society of America, Washington, D.C. (1953), p. 76).

Therefore, since my invention provides an increase in ultraviolet illumination in polarized lighting installations, there will be an increase in visual sensation for normal healthy eyes.

Most fluorescent lamps produce a certain amount of ultraviolet light, and many of the spectra of such lamps contain a peak in the ultraviolet at 365 nanometers. Full-spectrum lamps are defined as lamps having a color rendition index of 90 or above and a correlated color temperature of 5,000 degrees Kelvin or above. The visually effective F40/T12 Color Classer 75, with a correlated color temperature of 7,500 degrees Kelvin, and a color rendition index of 93, is a full-spectrum fluorescent lamp currently available from Duro-Test Corporation, Fairfield, N.J., and provides illumination not only in the visible range from 380 to 780 nanometers, but also provides a significant amount of ultraviolet light from 290 to 380 nanometers. This ultraviolet light is exactly the radiation capable of producing fluorescent effects.

Thus, the use of the Type V Series acrylic molding powder in the manufacture of the supporting layer for the multi-layer polarizing material eliminates much of the benefit of the ultraviolet light in improving the apparent brightness of paper and textile objects since a multi-layer polarized diffuser made from the Type V Series acrylic molding powder or a similar product would absorb most of the ultraviolet light between 290 and 380 nanometers.

FIG. 2 shows the spectral energy distribution of the F40/T12 Color Classer 75 fluorescent lamp, as provided to the inventor by the Duro-Test Corporation. As shown, there is production of much ultraviolet light between 290 and 380 nanometers.

In comparison to the Type V Series acrylic molding powder which absorbs much of the valuable ultraviolet light, use of the Type UVT acrylic molding powder or a similar product in the manufacture of the supporting acrylic of the multi-layer polarized diffuser would then allow almost all of the valuable ultraviolet light emitted from lamps between 290 and 380 nanometers to pass through the acrylic supporting structure and hence the ultraviolet light would be then vertically polarized where it could increase the apparent brightness of paper and textile materials without the harmful glare that results from unpolarized ultraviolet as well as unpolarized visible light.

The polarization effects would be expected to be greater in the ultraviolet than in the visible portion of the electromagnetic spectrum. It is known that the index of refraction of many materials varies with the wavelength of light, and the index of refraction increases with a decrease in the wavelength of light (see, for example, Halliday, David, and Resnick, Robert, *Physics*, John Wiley & Sons, New York, 1966, p. 1014–1015). As the index of refraction increases, the amount of polarization increases, especially for multi-layer type polarizing type materials. The multi-layer polarizers provide vertically polarized visible and ultraviolet light by means of reflection and refraction; the polarization effects are greater with an increase in the index of refraction, hence the degree of polarization will be greater in the ultraviolet region as compared with light in the visible portion of the spectrum.

It is also known that the ultraviolet light which is scattered in the sky is very highly polarized (see, for example, Feynman, Richard, et. al., *The Feynman Lectures on Physics,* Volume I, Addison-Wesley Publishing Company, Reading, Mass., (1963), p. 32–8). The scattering of ultraviolet light increases as the fourth power of the frequency of the spectrum. Thus, one should expect that the sky should be blue, since the blue light is more highly scattered than the light at the red end of the spectrum. This scattering is known as the Raleigh scattering in honor of the person who first discovered it. Daylight contains radiation down to 290 nanometers (see, Duffie, John, A. et. al., *Solar Energy Thermal Processes,* John Wiley & Sons, New York, 1974, p. 14, and Cayless, M. A., and Marsden, A. M., Lamps and Lighting, Edward Arnold, London, 1983, p. 4). Thus, the present invention of an ultraviolet transmitting polarized diffuser, when used in conjunction with full-spectrum fluorescent lamps, will provide a lighting system which is substantially duplicates natural daylight, and which contains vertically polarized ultraviolet light in addition to vertically polarized visible light. The previously available multi-layer polarized diffusers which are made from a Type V Series or similar acrylic molding powder block much of the ultraviolet light with wavelengths below about 380 nanometers.

An example of the use of the present invention which in no way limits its potential application is for the production of so called "north sky" lighting that artists prefer. In north sky lighting, one combines a 7,500 degree fluorescent lamp with an ultraviolet transmitting multi-layer polarized diffuser. A multi-layer polarized diffuser made from the Type V Series acrylic molding powder or a similar material would produce an inferior "north sky" effect due to the absence of ultraviolet light below 380 nanometers.

Passage of the ultraviolet light through the acrylic supporting layer of the present invention and through the multi-layer polarizer will reduce degradation of the acrylic materials, since the ultraviolet light is passing through the diffuser, rather than having an opportunity to interact with it. Thus, the need for periodic replacement of the lighting diffusers is reduced significantly, along with a reduction of the solid waste that would otherwise be added to the solid waste stream when materials are discarded in the trash.

Another benefit of the use of an ultraviolet transmitting polarized diffuser (as compared to ultraviolet absorbing polarized diffusers of the prior art) is the energy saving potential. Since objects will appear brighter due to fluoresce effects, one can install fewer lighting fixtures and spread them farther apart.

A secondary energy savings occurs because when the Type V Series acrylic molding powder is used to manufacture the multi-layer polarizer, the acrylic absorbs the ultraviolet light and is ultimately converted to heat. The diffuser heats up, which traps the heat from the fluorescent lamps inside the fixture. By allowing the ultraviolet light to easily pass through the ultraviolet transmitting multi-layer polarizer, additional heat can be rejected from the lighting fixture, and the heat build-up is reduced significantly, lowering the lamp operating temperature. It is known that reduced light output from a fluorescent fixture results from operating a fluorescent lamp above its optimum lamp wall temperature (see Jerome, Charles W., "Effect of Bulb Wall Temperatures on Fluorescent Lamp Parameters", Illuminating Engineering, February, 1956, pp. 205–213).

It has been shown by Cobb (see, Cobb, Percy W, and Moss, Frank E., "Lighting and Contrast", Transactions of the Illuminating Engineering Society, February, 1927, p. 195–204, also see Marks, Alvin, "Multilayer Polarizers and Their Application to General Polarized Lighting", Illuminating Engineering, February 1959 p. 127) that visual acuity increases with contrast. Marks provided proof using a set of algebraic equations that contrast will always be improved using polarized illumination. With the use of the ultraviolet transmitting multi-layer polarizer, contrast, and hence visual acuity, will be greater than when using a multi-layer polarizer with a supporting acrylic made of a Type V Series acrylic molding powder or a similar material, since the effect of the ultraviolet light will be to increase brightness of the paper which contains the optical brighteners which fluoresce under ultraviolet light. Note that the areas of paper covered by black print will not fluoresce, so there will be a definite increase in contrast between the print and the paper it is printed on when compared to illuminating the same paper with a light source giving off ultraviolet light and having the ultraviolet light blocked by a multi-layer polarized diffuser made of the Type V Series or similar acrylic molding powder.

A novel use of the ultraviolet transmitting multi-layer polarized diffuser would be for illumination using so called "black lights" that only give off ultraviolet light. Lighting fixtures using the ultraviolet transmitting polarized diffuser could be used for special effects lighting for nightclubs and other places of entertainment. As mentioned above, use of the ultraviolet transmitting multi-layer polarizer with an ultraviolet light source with provide vertically polarized ultraviolet light, as it is well known that glare from unpolarized radiation is detrimental to one's eyes and the ability to see.

BRIEF DESCRIPTION OF THE INVENTION

Figure 3:
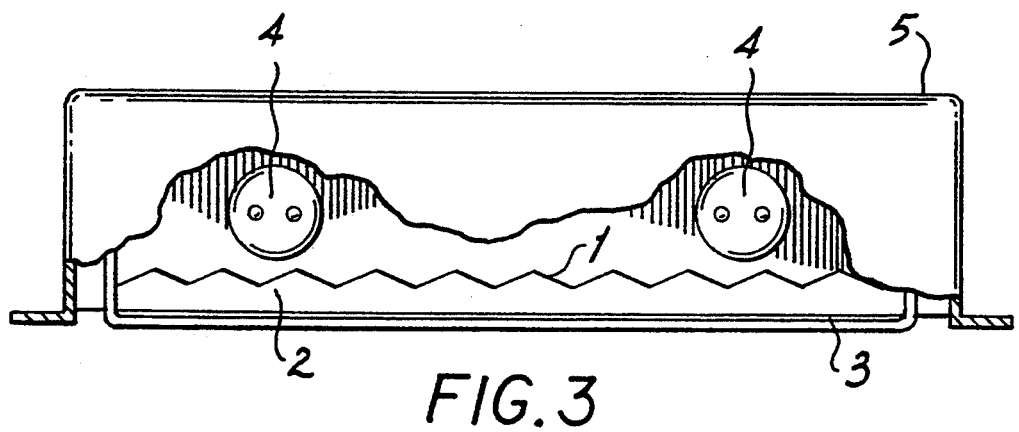
FIG. 3 is a side elevational view of the ultraviolet transmitting multi-layer polarizer of the present invention.

The invention and its embodiments may be better understood by referring to the following drawing where in like elements are referenced to with like numbers. FIG. 3 is a side view of the ultraviolet transmitting multi-layer polarizer.

DESCRIPTION OF THE PREFERRED EMBODIMENT

A vast improvement in visual performance and brightness of objects being illuminated is achieved by the use of the ultraviolet transmitting multi-layer polarizer. Referring now to FIG. 3, the prism side 1 of the ultraviolet transmitting multi-layer polarizer faces towards the full-spectrum fluorescent lamps or towards a source of ultraviolet and visible light. The supporting acrylic layer 2 transmits the ultraviolet light from the lamps to the multi-layer polarizing layer 3 on the bottom of the ultraviolet transmitting multi-layer polarizer. The function of the acrylic layer 2 is to support the thin polarizer 3 which is itself comprised of multiple layers as described in prior art. The assemblage of the supporting acrylic 2 and the polarizer 3 is manufactured in flat sheets for use in commercial fluorescent lighting fixtures.

Figure 1:
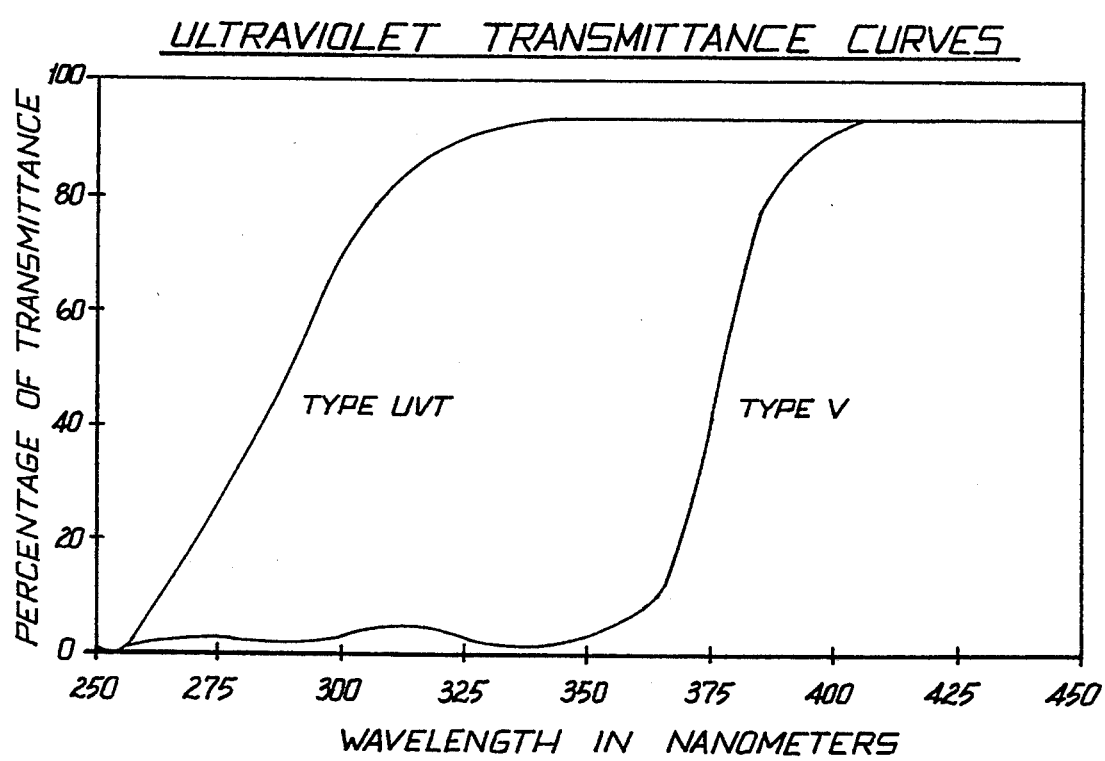
FIG. 1 is a graph chart comparing the transmission properties of the acrylic layer 2 of the ultraviolet transmitting multi-layer polarizer of the present invention and the prior art.

FIG. 1 shows the transmission properties of the Type V Series acrylic molding powder of acrylic layer 2 when used to produce an acrylic sheet 0.125 inches thick (taken from Rohm and Haas Technical Bulletin PL-612, (1988)). The light transmission properties of the Type V Series acrylic molding powders of acrylic layer 2 is shown for wavelengths between 250 and 450 nanometers. This 0.125 inch thickness of acrylic layer 2 is the thickness of the commercially available multi-layer polarized diffusers.

The present invention not only transmits the ultraviolet in the 290 to 380 nanometer range but also polarizes as well.

FIG. 1 also shows the transmission properties of a 0.125 inches thick ultraviolet transmitting acrylic layer 2 made from an acrylic molding powder such as the UVT type acrylic molding powder manufactured by Rohm and Haas (taken from Rohm and Haas Technical Bulletin PL-612e, (1985), p.5) from 250 to 450 nanometers. It should be noted that acrylic sheets manufactured the Type UVT acrylic molding powder, will transmit 85 percent of the ultraviolet light with a wavelength greater than 315 nanometers.

Acrylic layer 2 includes a type UVT acrylic molding powder or a similar material. The multi-layer polarized diffuser which results from the use of the Type UVT acrylic molding powder of acrylic layer 2 is capable of transmitting ultraviolet light with wavelengths as low as 290 nanometers. The resulting transmission of ultraviolet wavelengths all the way down to 290 nanometers provides a substantial improvement in the quality of the illumination.

The application of an ultraviolet transmitting acrylic layer 2 permits the transmission of the ultraviolet light emitted from a light source through the supporting acrylic layer 2 so the ultraviolet light would then be polarized by the multi-layer polarizing materials of thin polarizer 3 which are adhered to the bottom of the acrylic sheet of acrylic layer 2, which is the side of the sheet facing towards the objects being illuminated.

Figure 2:
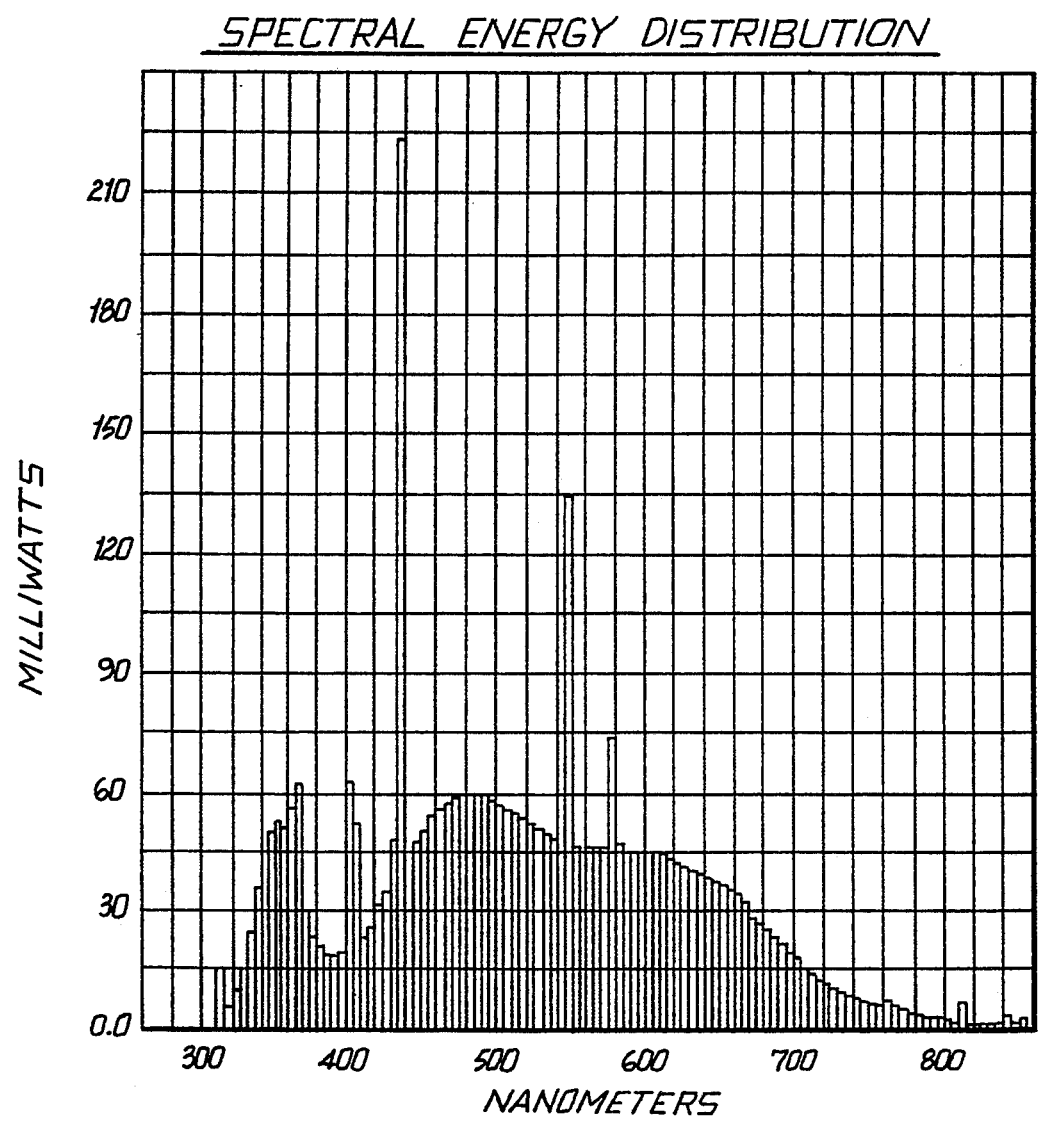
FIG. 2 is a graph chart showing the spectral energy distribution of a prior art 7,500 degree full-spectrum fluorescent lamp.

FIG. 2 shows the spectral energy distribution of the F40/T12 Color Classer 75 fluorescent lamp (not shown) as provided to the inventor by the Duro-Test Corporation. As shown, there is production of much ultraviolet light between 290 and 380 nanometers.

Thus, the present invention of an ultraviolet transmitting polarized diffuser, when used in conjunction with full-spectrum fluorescent lamps, provides a lighting system which substantially duplicates natural daylight, and which contains vertically polarized ultraviolet light in addition to vertically polarized visible light.

Passage of the Ultraviolet light through the acrylic supporting layer 2 of the present invention and through the multi-layer polarizer reduces degradation of the acrylic materials, since the ultraviolet light pass through the diffuser, rather than having an opportunity to interact with it.

Modifications can be made to the method used for making the device, the device itself as well as the process described for the ultraviolet transmitting multi-layer polarizer without departing from the spirit and scope of the invention as exemplified below in the appended claims.

I claim:

1. A multi-layer polarized diffuser with improved ultraviolet light transmission, the improvement comprising:

a thin multi-layered polarizer being disposed between a source of visible and ultraviolet light; and an area to be illuminated;

wherein the thin multi-layered polarizer is capable of transmitting wavelengths of polarized light of wavelengths between about 290 nanometers and about 800 nanometers;

wherein the multi-layered polarizer comprises a light transmitting support layer and a light polarizing layer;

wherein the light transmitting support layer is composed of material capable of transmitting light of wavelengths between about 290 and about 800 nanometers;

wherein the light transmitting support layer comprises a light diffuser for directed scattering of incident light emanating from a source of visible and ultraviolet light;

wherein the light polarizing layer comprises a thin sheet of light transmissible material, the thin sheet being capable of transmitting and polarizing light of wavelengths between about 290 and about 800 nanometers and wherein further the support layer comprises a flat light diffuser, the support layer comprising a first substantially flat and smooth surface and a second substantially textured surface and at least one edge, the at least one edge being disposed at the perimeter of the flat light diffuser; and further wherein the second substantially textured surface of the flat light diffuser faces toward, a source of visible and ultraviolet light, the textured surface being for refracting incident light emanating from a source of visible and ultraviolet light and further for providing a directed scattering of the incident light, the directed scattering comprising diffusion of the incident light; and further wherein the first substantially flat and smooth surface of the flat light diffuser faces toward the area to be illuminated by a source of visible and ultraviolet light.

2. The multi-layer polarized diffuser of claim 1, wherein the thin sheet light polarizing layer is disposed upon and supported by the light transmitting support layer, the thin sheet light polarizing layer being disposed upon and adhered to the first substantially flat and smooth surface of the flat light diffuser.

3. The multi-layer polarized diffuser of claim 2 wherein the light transmitting support layer is composed of molded acrylic polymer.

* * * * *